(12) United States Patent
Anzai et al.

(10) Patent No.: US 6,711,014 B2
(45) Date of Patent: Mar. 23, 2004

(54) MODULAR PERSONAL COMPUTER, CONNECTION DEVICE FOR MODULAR PERSONAL COMPUTER, METHOD OF COOLING MODULAR PERSONAL COMPUTER, AND PERSONAL COMPUTER SYSTEM

(75) Inventors: Masato Anzai, Machida (JP); Yoshihisa Kanada, Yokohama (JP); Shinsuke Noda, Yamatoshi (JP); Kenichi Tanaka, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 10/319,078

(22) Filed: Dec. 13, 2002

(65) Prior Publication Data

US 2003/0128510 A1 Jul. 10, 2003

(30) Foreign Application Priority Data

Dec. 14, 2001 (JP) .................... 2001-381501

(51) Int. Cl.$^7$ .............................. G06F 1/20
(52) U.S. Cl. ............. 361/687; 361/695; 165/80.3; 174/16.1; 62/259.2
(58) Field of Search ................. 361/685–687, 361/695, 690–692, 717–719; 165/80.3, 165.185, 122–124; 174/15.1, 16.1; 62/259.2

(56) References Cited

U.S. PATENT DOCUMENTS

| | | | |
|---|---|---|---|
| 5,378,957 A | * | 1/1995 | Kelly ................... 313/231.01 |
| 6,525,936 B2 | * | 2/2003 | Beitelmal et al. ........... 361/695 |
| 2003/0128510 A1 | * | 7/2003 | Anzai et al. ................ 361/687 |

FOREIGN PATENT DOCUMENTS

EP 0412443 A1 * 2/1991

* cited by examiner

Primary Examiner—Hung Van Duong
(74) Attorney, Agent, or Firm—Martin J. McKinley

(57) ABSTRACT

A modular personal computer of the present invention includes inlet and outlet openings for a cooling air flow, which are provided on a side portion of a housing disposed opposite to a desktop connection device, with the openings being spaced from each other across a central processing unit, and air passages extending between the inlet and outlet openings in an overlapping manner. Static pressure near the outlet opening is reduced by a diffuser. Air inside the modular personal computer is drawn out through the outlet opening to create negative pressure inside the modular personal computer, so that the cooling air flow is introduced from the inlet opening.

19 Claims, 16 Drawing Sheets

FIG.14
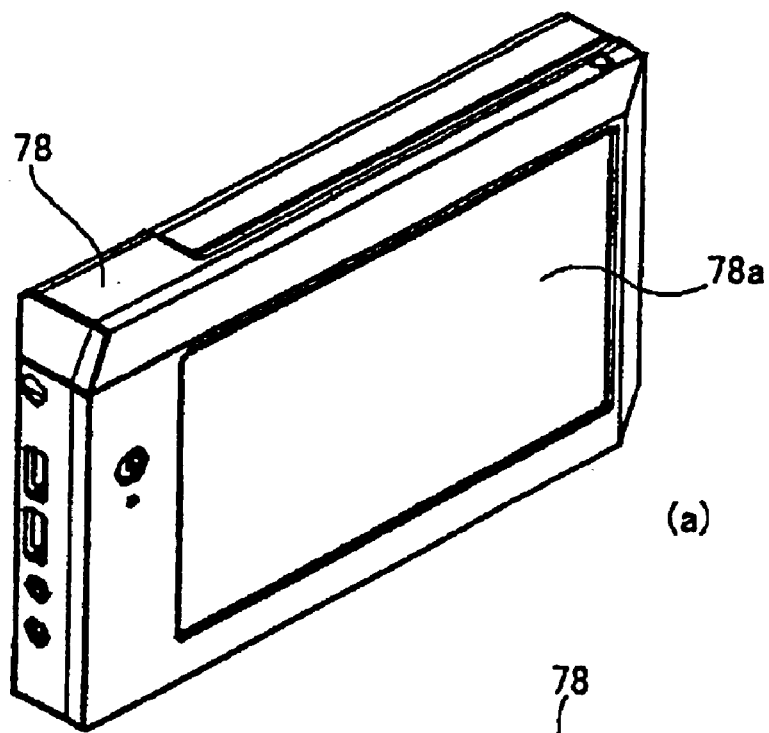
(a)
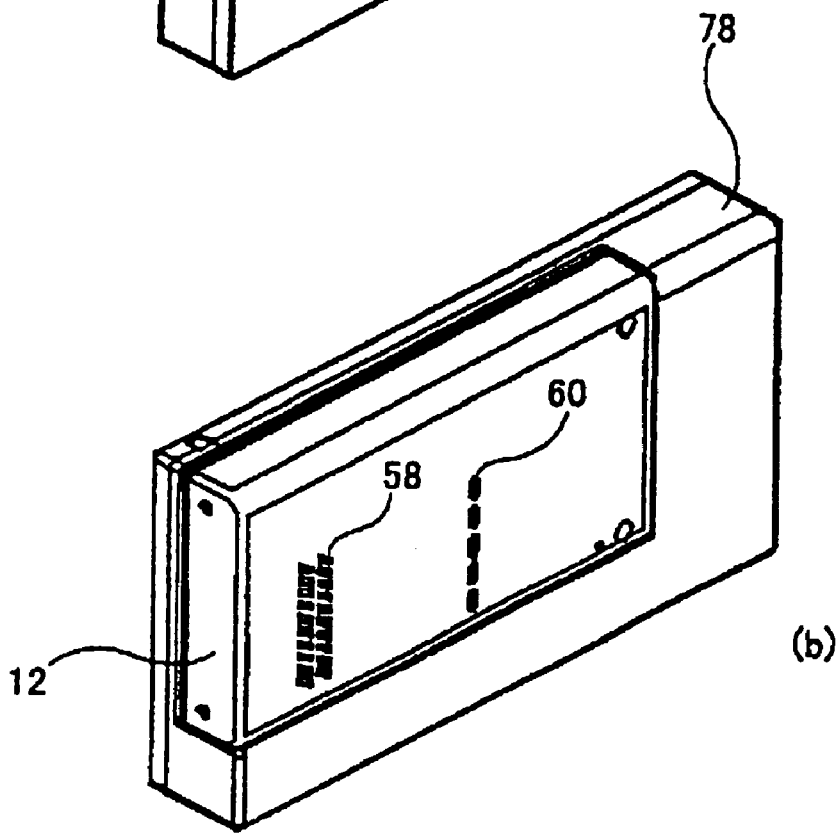
(b)

MODULAR PERSONAL COMPUTER, CONNECTION DEVICE FOR MODULAR PERSONAL COMPUTER, METHOD OF COOLING MODULAR PERSONAL COMPUTER, AND PERSONAL COMPUTER SYSTEM

FIELD AND BACKGROUND OF INVENTION

The present invention relates to a personal computer system including a portable modular personal computer (hereinafter referred to as a "modular PC"). More specifically, the present invention relates to a modular PC, which is designed such that a side face of a housing is cooled by a cooling air flow from outside instead of providing cooling means such as a cooling fan inside the modular PC in order to enhance portability thereof, and that the inside and outside of the modular PC are cooled simultaneously by drawing out air utilizing negative pressure generated by a diffuser designed to generate differential pressure. The present invention also relates to a connection device for effectuating efficient cooling of the modular PC by connecting to the modular PC, a method of cooling the modular PC, and a personal computer system including the modular PC and the connection device.

Portable personal computer terminals such as pagers or personal digital assistants are widely used in recent years. More recently, in order to enhance usability of the above-mentioned portable personal computer terminals, there is proposed a modular PC using elements such as a central processing unit (CPU), hard disk drive and memory while separating a display unit. The modular PC is constituted as detachable from a portable connection device including displaying means such as a liquid crystal display device, or from a desktop connection device for effectuating display on a desktop display device (such a desktop connection device is hereinafter referred to as a docking station in this specification). Such a system is connected to the portable connection device or to the desktop connection device disposed on the top of a desk for performing high-level processing, as necessary, to enhance user-friendliness.

As described above, a modular PC includes elements such as a CPU, memory and small hard disk drive therein. Some important issues on the modular PC include, achievement in down-sizing to enhance portability, energy designs therefor, and efficient measures against heat generated from a heat source such as the CPU considering the life of internal elements accommodated in a housing.

As disclosed in Japanese Unexamined Patent Publication No. 2000-165077, it has been proposed to cool the inside of a personal computer using an external cooling device to generate an air flow within the personal computer by blowing air into the inside of the personal computer and drawing out the air from the inside with cooling means such as a cooling fan.

However, according to the cooling method disclosed in Japanese Unexamined Patent Publication No. 2000-165077, it is necessary to flow a large amount of air for cooling the entire computer. Accordingly, when a user works on the personal computer by disposing a docking station on the top of a desk for connecting the down-sized modular PC, noises attributable to the cooling fan are increased when the user enhances the capability of the cooling fan in order to supply a larger air flow to the modular PC. Therefore, there is inconvenience that a countermeasure against the noises is required.

Further, Japanese Unexamined Patent Publication No. 2000-227823 discloses a method of cooling the inside of a personal computer by using an air flow generated with a cooling fan disposed inside the personal computer, and also using the Bernoulli theorem. FIG. 16 illustrates the method of cooling the inside of a personal computer disclosed in Japanese Unexamined Patent Publication No. 2000-227823.

As shown in FIG. 16 of the accompanying drawings, air inside a personal computer 80 is discharged to the outside of the personal computer 80 in a direction indicated by an arrow A by a cooling fan 82 disposed therein. However, in a lower region inside the personal computer 80 partitioned by a printed circuit board 84, the cooling fan 84 cannot generate or supply a sufficient air flow, whereby heat tends to remain in the region. Therefore, according to the method disclosed in Japanese Unexamined Patent Publication No. 2000-227823 as illustrated in FIG. 16, an opening 86 is provided in the vicinity of the cooling fan 82, and a diffuser 88 is disposed so as to cover the opening 86. With such a configuration, static pressure is reduced in the vicinity of the opening 86 according to the Bernoulli theorem. Therefore, even in the region where the airflow caused by the cooling fan 82 cannot be supplied sufficiently inside the personal computer 80, the air therein is drawn out in a direction indicated by an arrow B, and cooling efficiency is thereby improved.

Although the cooling method disclosed in Japanese Unexamined Patent Publication No. 2000-227823 can cool the region where the cooling fan cannot generate the air flow efficiently, it is not applicable to a modular PC which requires enhanced portability, long-term drive with low power consumption, and achievement of smaller size and lighter weight. Further, simply disposing the external cooling device as disclosed in Japanese Unexamined Patent Publication No. 2000-165077, it is inevitable to increase a capacity of the cooling fan unnecessarily larger as described above. Accordingly, when the modular PC is used with it being connected to the desktop connection device placed on the top of a desk, a separate measure should be taken to reduce loud noise generated by the cooling fan, which causes inconvenience that portability and compactness of the modular PC are lowered.

SUMMARY OF THE INVENTION

In view of the above, it is an object of the present invention to provide a modular PC, a connection device usable in combination with the modular PC, a method of cooling the modular PC, and a personal computer system using the cooling method, in which the personal computer system is composed of separate modules such as the modular PC and a desktop connection device, and the inside of the modular PC is efficiently cooled while maintaining portability and compactness of each module.

The present invention cools a modular PC by cooling an outside wall thereof, and also creates negative pressure inside the modular PC by means of cooling air flowing along the outside wall so that the cooling air flow is drawn in. The present invention is based on the finding that cooling efficiency can be considerably improved if the air flow thus drawn in is usable for cooling a heat source such as a CPU. Thus, the present invention performs cooling by first creating the air flow along the outside wall of the modular PC, so as to enhance the cooling efficiency of the inside of the modular PC by use of cooling means such as a cooling fan provided, for example, in a desktop connection device placed on the top of a desk.

The modular PC is provided with inlet and outlet openings for the cooling air flow for cooling the inside of the modular PC. In the present invention, a diffuser functioning as differential pressure generating means is formed, which extends near the outlet opening for the cooling air flow and across the direction of the air flow flowing along the outside wall. The diffuser can be disposed either on the modular PC side or on a docking station side.

As the air flow moves along an outside wall surface of the modular PC and thereby flows through the diffuser, static pressure in the vicinity of the diffuser is reduced according to the Bernoulli's theorem. It is possible to draw out the air flow from the inside of the modular PC by positioning the outlet opening in a region where the static pressure is reduced. Negative pressure inside the modular PC thus created allows the cooling air flow to be introduced into the modular PC through the inlet opening. The air flow thus created passes through air passages, which are formed inside the modular PC so as to overlap the CPU, enabling the internal cooling of the modular PC.

Specifically, the present invention provides a personal computer system including a portable module, which comprises a modular personal computer including at least a storage device and a central processing unit inside a housing, used by connecting to a connection device which is separately constituted, and provided with an inlet opening and an outlet opening for a cooling air flow which are disposed on the same side portion of the housing with a space therebetween so as to sandwich the central processing unit, the connection device constituted by including cooling means for cooling the side portion of the modular personal computer, and differential pressure generating means for reducing static pressure near the outlet opening in relation to relative disposition between the modular personal computer and the connection device, wherein the cooling air flow is introduced into the modular personal computer from the inlet opening by reducing the static pressure near the outlet opening to thereby draw out air inside the modular personal computer so as to create negative pressure inside the modular personal computer.

In the personal computer system of the present invention, it is preferred that the static pressure at the outlet opening is reduced by increasing a flow rate of the airflow flowing near the outlet opening by use of the differential pressure generating means. In the personal computer system of the present invention, it is preferred that the differential pressure generating means is constituted as a diffuser disposed close to the outlet opening and on an upstream side in a direction of the air flow flowing near the outlet opening. In the personal computer system of the present invention, the diffuser may be located on the connection device or a side face of the housing, and the connection device may be disposed at least on the top of a desk.

The present invention also provides a modular personal computer including at least a storage device and a central processing unit inside a housing, and used by connecting to a connection device which is separately constituted, which comprises an inlet opening and an outlet opening for a cooling air flow which are disposed on a side portion of the housing facing the connection device while sandwiching the central processing unit, and an air passage extended between the inlet opening and the outlet opening, wherein the cooling air flow is introduced into the modular personal computer from the inlet opening by reducing static pressure near the outlet opening and drawing out air inside the modular personal computer by use of differential pressure generating means for reducing the static pressure near the outlet opening and to thereby create negative pressure inside the modular personal computer.

In the modular personal computer of the present invention, the differential pressure generating means may be constituted as means for increasing a flow rate of the air flow flowing near the outlet opening. In the modular personal computer of the present invention, it is preferred that the differential pressure generating means is disposed close to the outlet opening and on an upstream side in a direction of the air flow flowing near the outlet opening. In the modular personal computer of the present invention, it is preferred that the differential pressure generating means is located on the housing. In the modular personal computer of the present invention, it is preferred that a thermodiffusive member is thermally connected to the central processing unit, and that the thermodiffusive member is extended beyond the inlet opening and the outlet opening and across the cooling air flow. It is also preferred that a cooling air passage is formed between the thermodiffusive member and a side portion of the housing on which each of the openings is formed.

The present invention further provides a connection device to be connected to a modular personal computer including at least a storage device and a central processing unit inside a housing, used by connecting to the connection device which is separately constituted, and provided with an inlet opening and an outlet opening for a cooling air flow which are disposed on a side portion of the housing with a space therebetween so as to sandwich the central processing unit, which comprises means for generating an air flow along the side portion of the modular personal computer when the connection device is connected to the modular personal computer, and differential pressure generating means for reducing static pressure of the air flow near the outlet opening in relation to relative disposition between the modular personal computer and the connection device to thereby create negative pressure inside the modular personal computer through the outlet opening.

In the connection device of the present invention, it is preferred that the differential pressure generating means introduces the cooling air flow from the inlet opening by reducing the static pressure near the outlet opening to thereby draw out air inside the modular personal computer so as to create negative pressure inside the modular personal computer. In the connection device of the present invention, the differential pressure generating means may be constituted as means for increasing a flow rate of the air flow flowing near the outlet opening. In the connection device of the present invention, it is preferred that the differential pressure generating means is disposed close to the outlet opening and on an upstream side in a direction of the air flow flowing near the outlet opening. In the connection device of the present invention, it is preferred that the differential pressure generating means is located on the connection device and that the connection device is disposed at least on the top of a desk.

The present invention further provides a method of cooling a modular personal computer, comprising the steps of providing a modular personal computer including at least a storage device and a central processing unit inside a housing, used by connecting to a connection device which is separately constituted, and provided with an inlet opening and an outlet opening for a cooling air flow which are disposed on the same side portion of the housing with a space therebetween so as to sandwich the central processing unit, connecting the side portion of the modular personal computer closely to the connection device including cooling means, generating a cooling air flow in the modular personal computer from the cooling means, reducing static pressure near the outlet opening by relative displacement between the modular personal computer and the connection device, and introducing the cooling air flow into the modular personal computer from the inlet opening by reducing the static pressure near the outlet opening to thereby draw out air inside the modular personal computer so as to create negative pressure inside the modular personal computer.

In the cooling method of the present invention, the reducing step may include the step of increasing a flow rate of the air flow flowing near the outlet opening by use of differential pressure generating means. In the cooling method of the present invention, the reducing step may include the step of increasing a flow rate of the air flow flowing near the outlet opening by use of a diffuser disposed closed to the outlet opening and on an upstream side in a direction of the air flow flowing near the outlet opening. In the cooling method of the present invention, it is preferred that the diffuser is located on the connection device or a side face of the housing, and that the connection device is disposed at least on the top of a desk. In the cooling method of the present invention, it is preferred that a thermodiffusive member is thermally connected to the central processing unit, and that the thermodiffusive member is extended beyond the inlet opening and the outlet opening and across the cooling air flow. It is also preferred that an air passage is formed between the thermodiffusive member and the side portion of the housing on which each of the openings is formed.

BRIEF DESCRIPTION OF DRAWINGS

Some of the purposes of the invention having been stated, others will appear as the description proceeds, when taken in connection with the accompanying drawings, in which:

FIG. 14 shows a state that the module PC is connected to the connection device according to another embodiment of the present invention.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
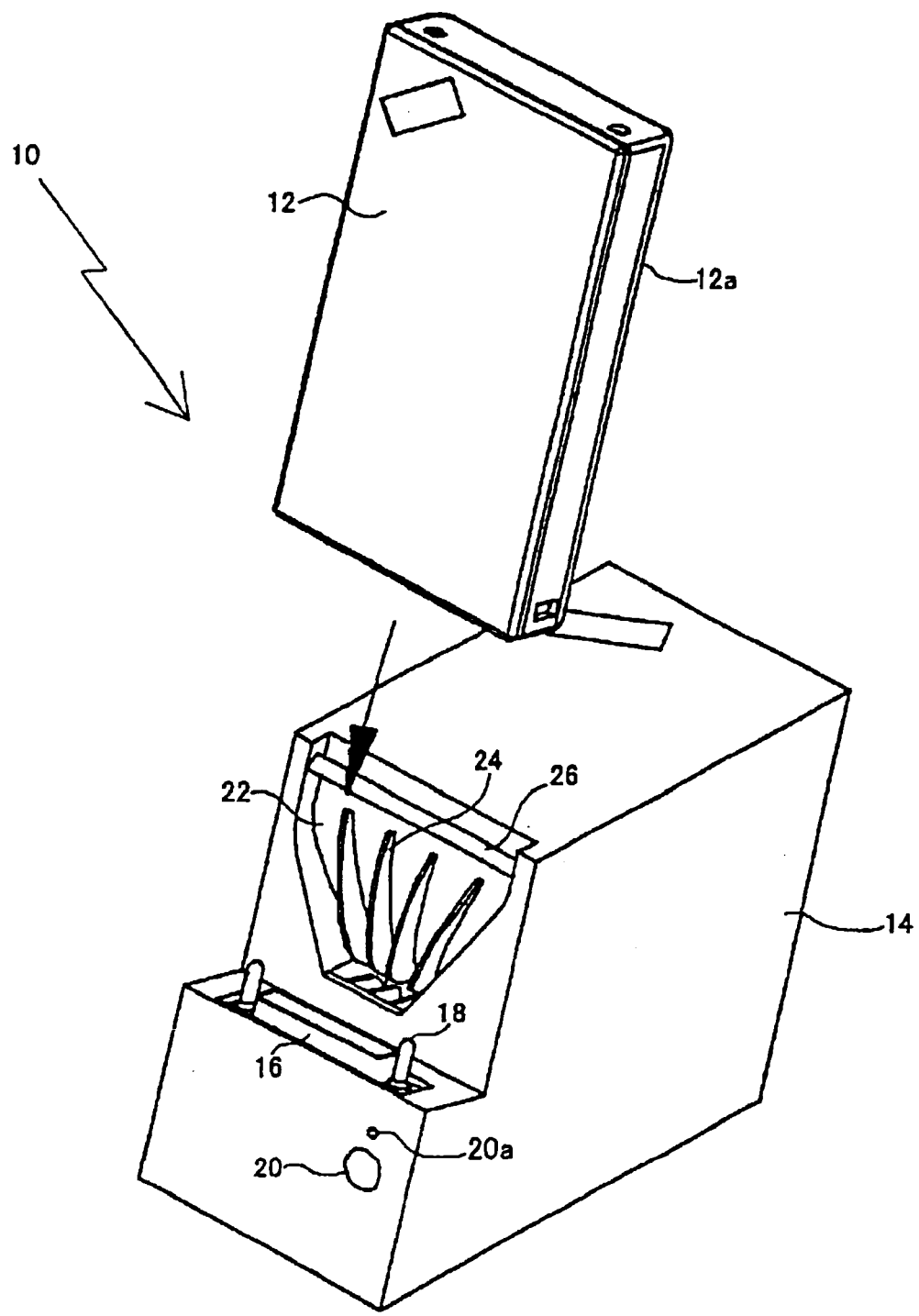
FIG. 1 is a perspective view showing a personal computer system according to the present invention in which a modular PC of the present invention is being connected to a docking station.

FIG. 1 is a schematic perspective view of a personal computer system 10 according to the present invention. The personal computer system 10 of the present invention includes a modular PC 12 and a docking station 14 provided separately from the modular PC 12 for functioning as a connection device to which the modular PC 12 is connected. The modular PC 12 includes displaying means such as a liquid crystal display device described later. The modular PC 12 writes or stores information in a hard disk drive disposed therein by use of portable connecting means provided separately.

In the present invention, the above-mentioned connection device may be a desktop connection device which is disposed on the top of a desk and supplies high power to a CPU so as to offer higher-grade processing capability to a user, or a small-sized and lightweight portable connection device using a power source such as a battery from a portability standpoint. When the modular PC 12 is connected to the portable connection device, it is normally driven in a power-saving mode so as not to cause a heat problem. The docking station 14 can be placed on the top of a desk, or on an office floor in order to save space on the desk. In the following, the present invention will be described in detail regarding the embodiment in which a fixed connection device, namely the docking station 14, which requires efficient dissipation of heat from a heat source, is disposed on the desk.

As shown in FIG. 1, the docking station 14 drives the modular PC 12 by supplying necessary power thereto. The docking station 14 includes cooling means for cooling down heat generated at the CPU in the course of driving the modular PC 12. The docking station 14 also includes various terminals at the back thereof for transferring information retained in the modular PC 12 to a desktop display device (not shown), for example, where the transferred information is displayed, so that user operations in an office can be performed under an environment similar to a conventional personal computer.

The modular PC used in the present invention specifically refers to a module having a pocket-sized housing and weight, which includes a CPU, a memory, a small-sized hard disk drive and can be operated under a power-saving mode. When this modular PC is used as a mobile PDA, the modular PC is connected to a connection device including a touch panel or an LCD panel operable to input with a stylus pen. Alternatively, when the modular PC is used as a desktop personal computer system in an office, the module PC is connected to the above-described docking station 14.

In the embodiment shown in FIG. 1, the modular PC 12 is connected to the docking station 14 through a connector 16 and pins 18. The docking station 14 is constituted to supply necessary power to the modular PC 12, and to transfer the information retained by the modular PC 12 to another device such as a desktop display device or a printer. According to the present invention, it is possible to connect between the modular PC 12 and the docking station 14 with any known method in addition to the one described above. A switch 20 for operating the docking station 14 and a monitor lamp 20*a* are provided at a lower part on a front face of a body of the docking station 14 so as to operate the modular PC 12 via the docking station 14.

An air discharge portion 22 is formed on a front part of the docking station 14. This air discharge portion 22 of the docking station 14 is spatially connected to the inside of the docking station 14 through a passage (not shown), and has a shape allowing an air flow generated by a cooling fan disposed inside the docking station 14 to flow along the back 12*a* of the modular PC 12. Additionally, a plurality of fins 24 for guiding the air flow to be discharged are provided at the air discharge portion 22 of the docking station 14 shown in FIG. 1 so that a direction of the discharged air flow is made controllable. Note that the fins 24 are not indispensable, and may be omitted as will be described later in another embodiment.

A diffuser 26 used as differential pressure generating means in the present invention is provided in the vicinity of an upper end portion of the air discharge portion 22 of the docking station 14 shown in FIG. 1. When connected to the modular PC 12, the diffuser 26 reduces static pressure in an outlet opening region formed on the modular PC 12 in accordance with the Bernoulli's theorem. Therefore, in the present invention, cooling air can be drawn in from an inlet opening for cooling air provided on the modular PC 12 even if cooling means for the modular PC is not particularly disposed inside the modular PC. As will be described later in detail, it is preferred that the diffuser 26 shown in FIG. 1 is disposed close to an upstream side in a direction of the air flow at the outlet opening when the diffuser 26 is connected with the modular PC 12.

Figure 2:
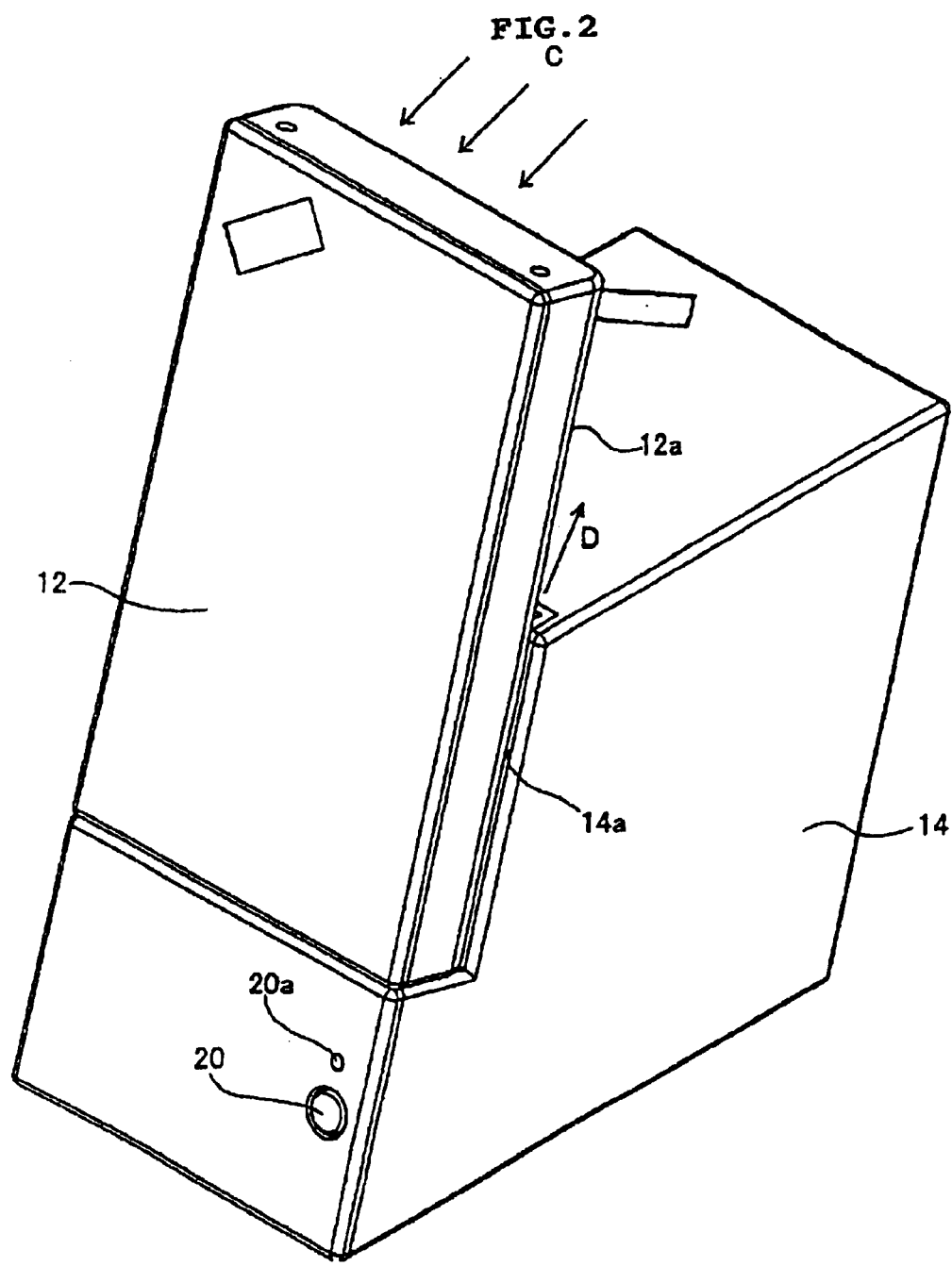
FIG. 2 is a perspective view showing a state that the modular PC and docking station of the present invention are connected to each other.

FIG. 2 is a perspective view showing the embodiment in which the modular PC 12 and docking station 14 according to the present invention are joined together to one body. As shown in FIG. 2, when the modular PC 12 and the docking station 14 are joined together, the back 12*a* of the modular PC shown in FIG. 1 and a front upper side portion 14*a* of the docking station 14 closely contact with each other except for the air discharge portion 22. With the above-described constitution, unity between the modular PC 12 and the docking station 14 is improved and an air passage for cooling the modular PC 12 is defined. In FIG. 2, the cooling air for cooling the modular PC 12 is drawn in from an upper part of the modular PC as indicated by an arrow C, and is discharged or drawn out in the vicinity of the diffuser 26 in a direction as indicated by an arrow D. In this way, the flow of the cooling air along the back 12*a* of the modular PC 12 is not blocked.

Figure 3:
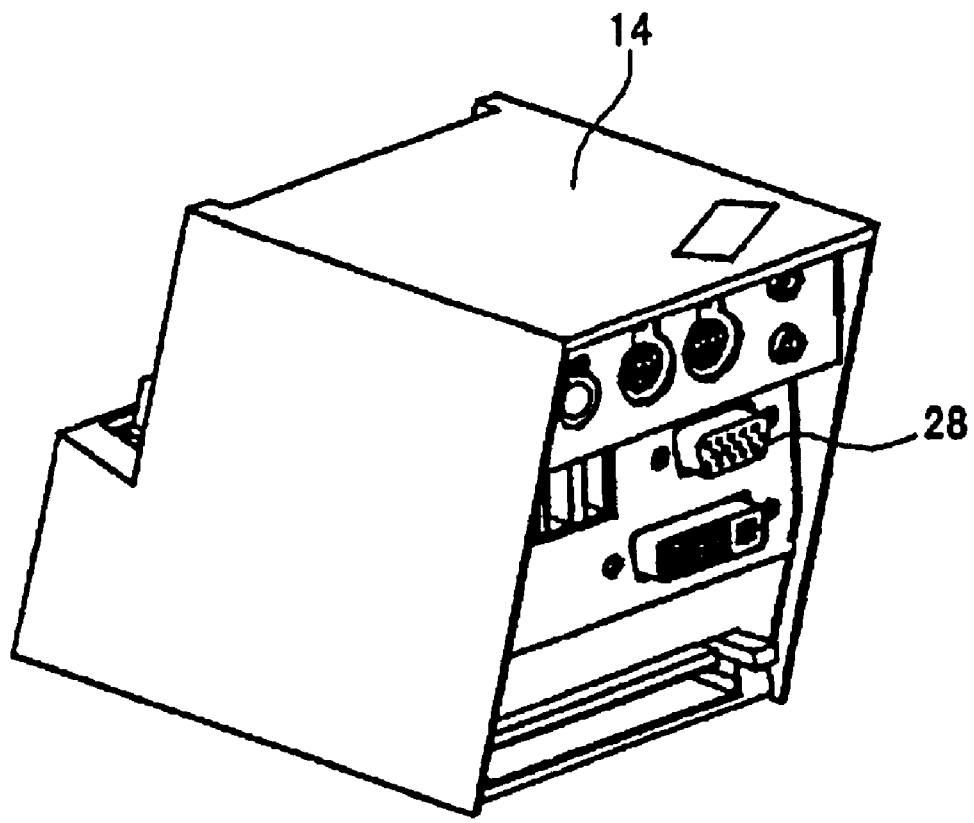
FIG. 3 is a perspective view of the back of the docking station of the present invention.

FIG. 3 is a perspective view showing a constitution of the back of the docking station 14 shown in FIGS. 1 and 2. As shown in FIG. 3, various connectors 28 are provided on the back of the docking station 14 to allow data transfer to and from external devices such as a desktop display device and a printer. Types and number of these connectors 28 may vary depending on the needs. As described above, since the docking station 14 can be disposed closer to the user as compared to the conventional personal computer, the modular PC 12 should be cooled efficiently so as to prevent inconvenience from arising, such as increase in air blow noise due to increase in the capacity of the cooling fan, and increase in size and cost of the docking station 14 due to increase in the capacity of a power unit.

Figure 4:
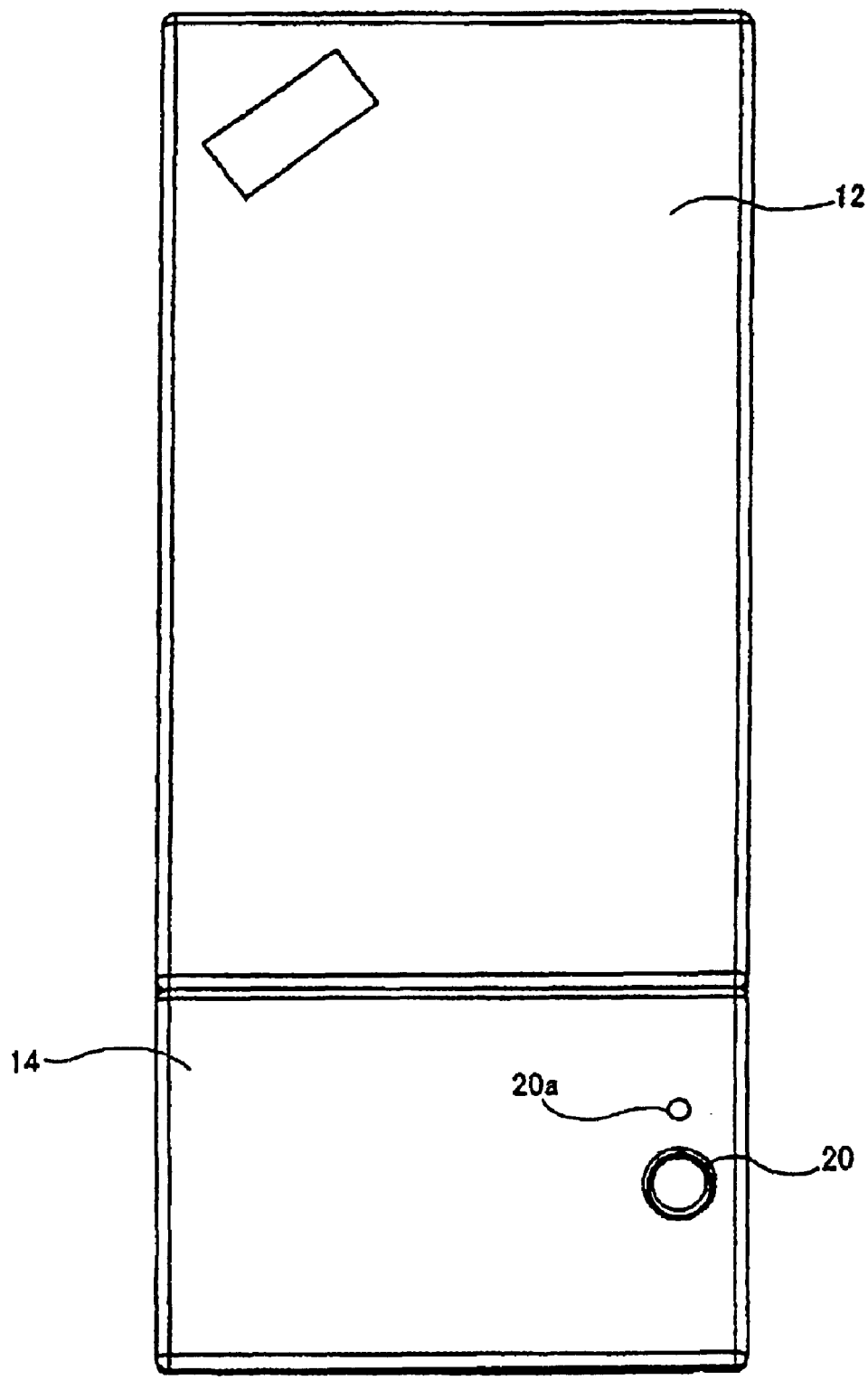
FIG. 4 is a front view showing the state that the modular PC and docking station of the present invention are connected to each other.

FIG. 4 is a front view of the embodiment in which the modular PC 12 and the docking station 14 are joined together. In the embodiment shown in FIG. 4, the modular PC 12 is disposed on the docking station 14 in an upright form. However, as long as the modular PC 12 can be cooled properly, the modular PC 12 and the docking station 14 need not necessarily be joined together in the upright form as shown in FIG. 4. As will be described later in detail, according to another embodiment of the present invention, the modular PC 12 and the docking station 14 may be joined together in a landscape form in which only the modular PC 12 is turned by 90 degrees from the upright disposition shown in FIG. 4.

Figure 5:
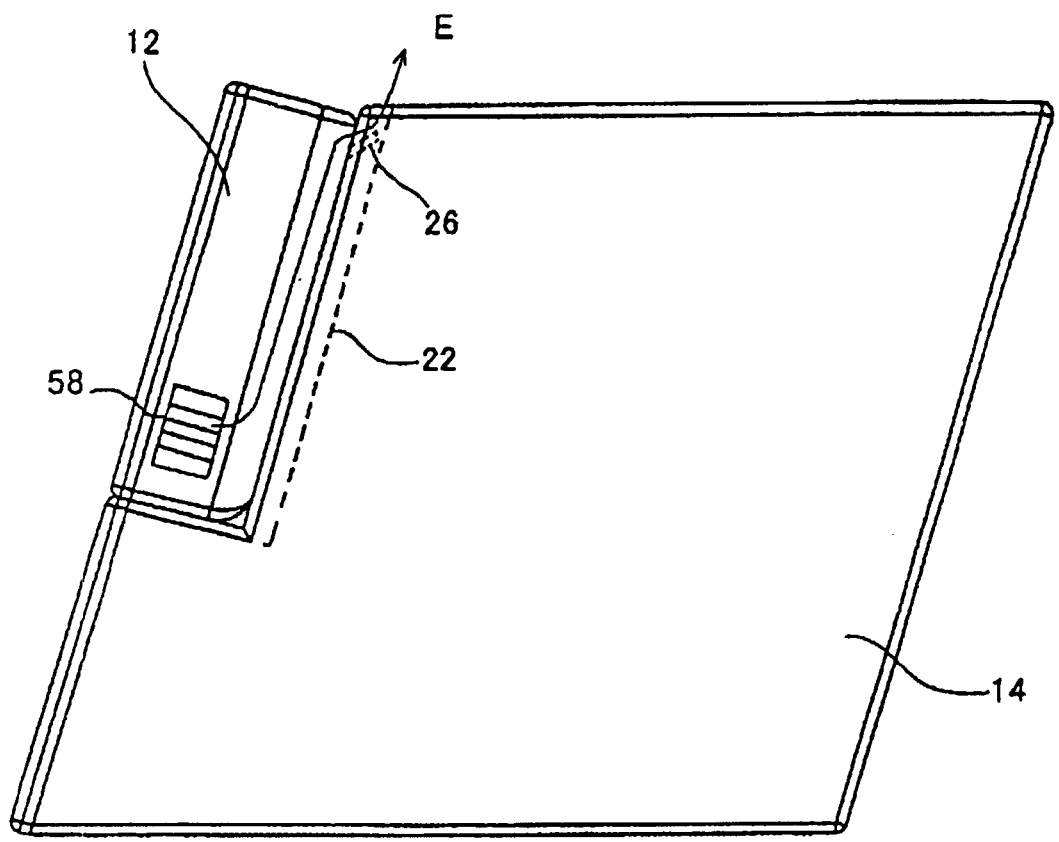
FIG. 5 is a side view showing a state that the modular PC and docking station are connected to each other according to another embodiment of the present invention.

FIG. 5 is a side view showing the other embodiment in which the modular PC 12 of the present invention is connected to the docking station 14 in the landscape form. In the embodiment shown in FIG. 5, it is also possible to form a landscape constitution of the docking station 14 by modifying an aspect ratio thereof so as to correspond to the landscape disposition of the modular PC 12. When the embodiment shown in FIG. 5 is adopted, it is possible to increase or extend the length of the air discharge portion 22 illustrated by a broken line in FIG. 5 along a direction crossing the cooling air flow, and correspondingly increase the inlet opening or the outlet opening so as to increase the intake of the cooling air. In FIG. 5, the position of the diffuser 26 provided on the docking station 14 is indicated by another broken line.

Furthermore, in the specific embodiment of the present invention shown in FIG. 5, the inlet opening 58 for the cooling air is disposed on a side face at a lower portion of the modular PC 12, so that the cooling air flows from a lower side portion of the modular PC 12 toward the outlet opening at an upper portion thereof in a direction indicated by an arrow E. As described above, according to the present invention, the cooling air can be drawn into the modular PC 12 from the upper portion or the lower portion of the modular PC 12, and the direction of the cooling air flow can be appropriately set in accordance therewith.

Figure 6:
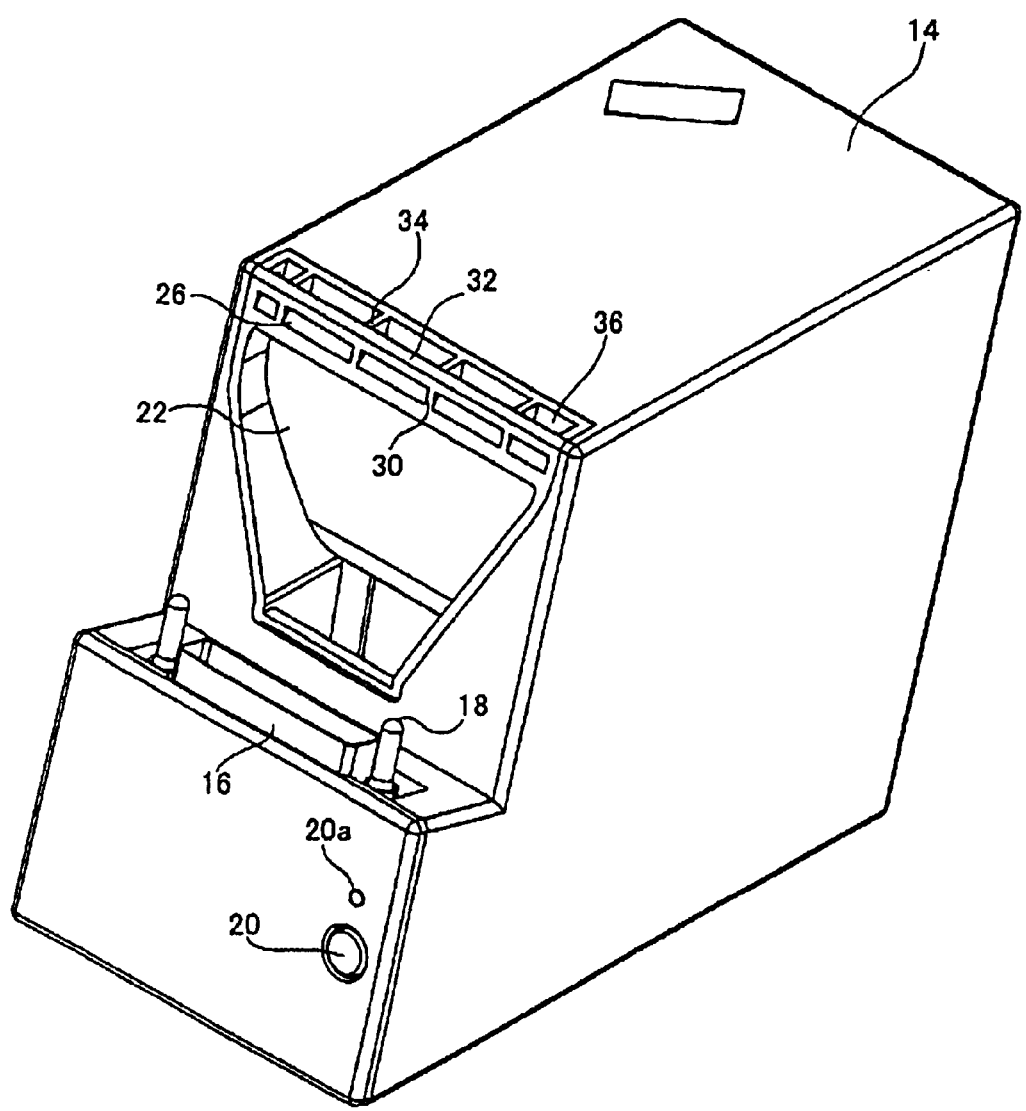
FIG. 6 is a perspective view of the docking station according to another embodiment of the present invention.

FIG. 6 is a perspective view showing another embodiment of the docking station 14 of the present invention, which is different from the embodiment shown in FIG. 1. The docking station 14 of the present invention shown in FIG. 6 has substantially the same shape as the docking station shown in FIG. 1. However, the docking station 14 shown in FIG. 6 is different from the docking station 14 shown in FIG. 1 in that the fins 24 are not formed in the air discharge portion 22, and a plurality of ribs 30 for protecting the diffuser 26 and a connecting member 32 for holding the diffuser 26 by connecting the ribs 30 are formed around the diffuser 26 instead.

Since the docking station 14 shown in FIG. 6 is not provided with the fins for routing the air to be discharged, a whistling noise due to the air flow is reduced and a protective measure for the diffuser 26 is improved. Moreover, openings 36 defined by the connecting member 32, a wall face of the air discharge portion 22, and the ribs 34 extending between the connecting member 32 and a housing of the docking station 14 are formed at an upper portion of the diffuser 26, so that the cooling air can be discharged smoothly. In the embodiment of the present invention shown in FIG. 6, the fins shown in FIG. 1 may also be used properly.

Figure 7:
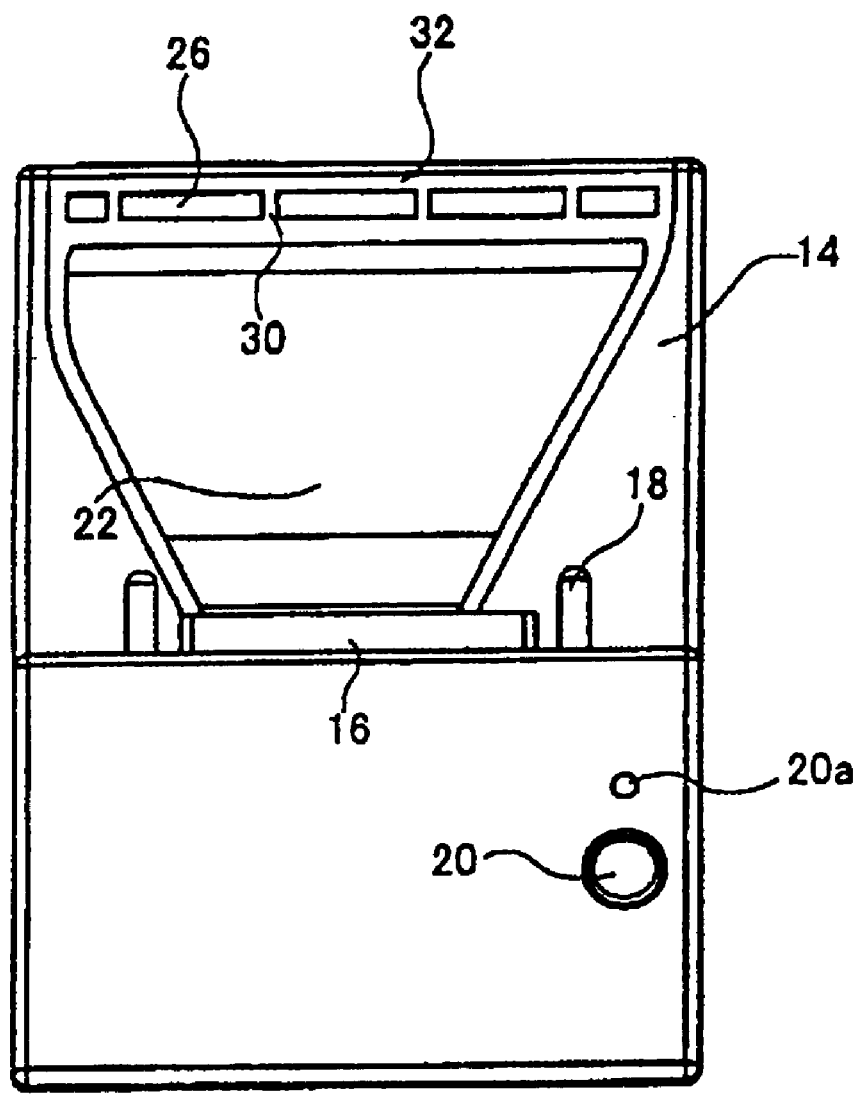
FIG. 7 is a front view of the docking station shown in FIG. 6.

FIG. 7 is a front view of the embodiment of the docking station 14 shown in FIG. 6. As shown in FIG. 7, the air discharge portion 22 is not provided with the fins, so that the air discharged from the inside of the docking station 14 is directly blown onto the back 12a of the modular PC without routing. Also, as shown in FIG. 7, the ribs 30 extend from the connecting member 32 at the upper portion of the diffuser 26, so that unity between the diffuser 26 and the housing of the docking station 14 is improved.

Figure 8:
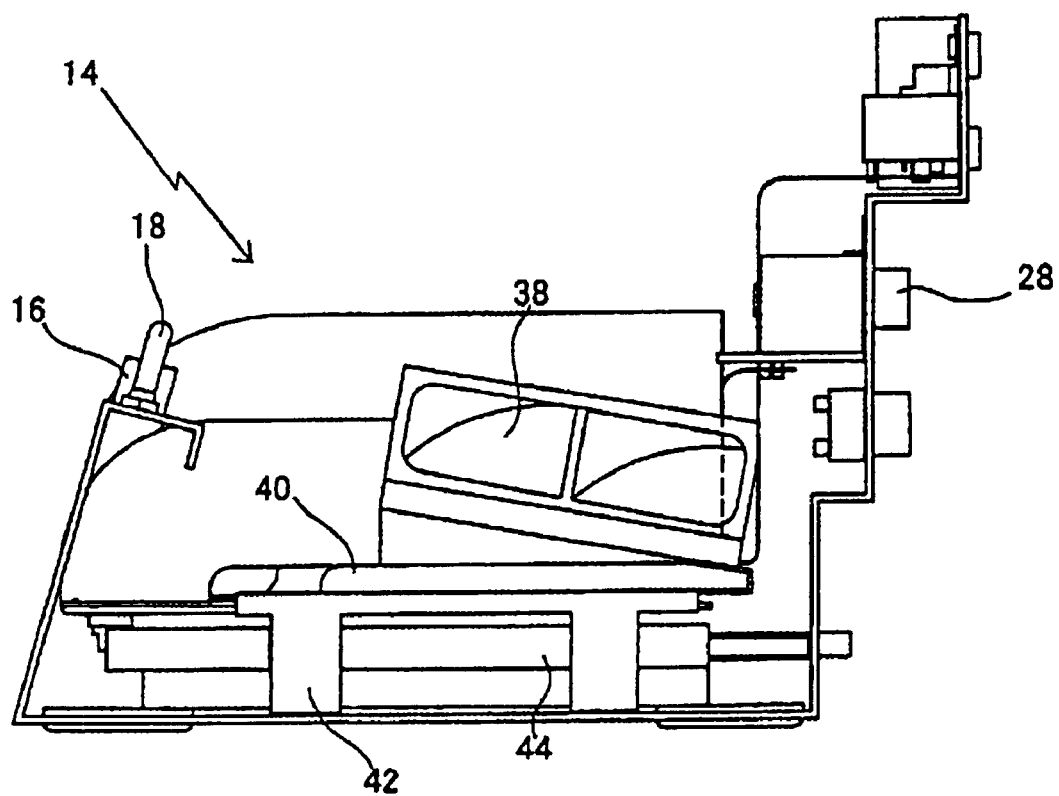
FIG. 8 is an exploded side view of the docking station of the present invention.

FIG. 8 is a side view showing an internal constitution of the docking station 14 of the present invention by removing the housing of the docking station 14. As shown in FIG. 8, the docking station 14 of the present invention includes the connector 16 and the pins 18 for attaching the modular PC 12 which allow the modular PC 12 to be firmly retained on the housing of the docking station 14. Also, as previously described, the connector 28 for transferring information to an external device such as a desktop display device is disposed on the back of the docking station 14.

Inside the docking station 14 shown in FIG. 8, a cooling fan 38 used as cooling means is fixed to the docking station 14 via a socket 44 which includes a fan bracket 40 constituted in accordance with the PCMCIA standard and an extended portion 42 also constituted in accordance with the PCMCIA standard. Power is supplied to the cooling fan 38 via the socket 44 so as to drive the cooling fan 38. The cooling fan 38 is mounted on the fan bracket 40 with an appropriate inclined angle to allow the cooling air to flow along the back of the modular PC 12 through a passage (not shown) spatially connected to the air discharge portion 22 formed on the housing (not shown).

Figure 9:
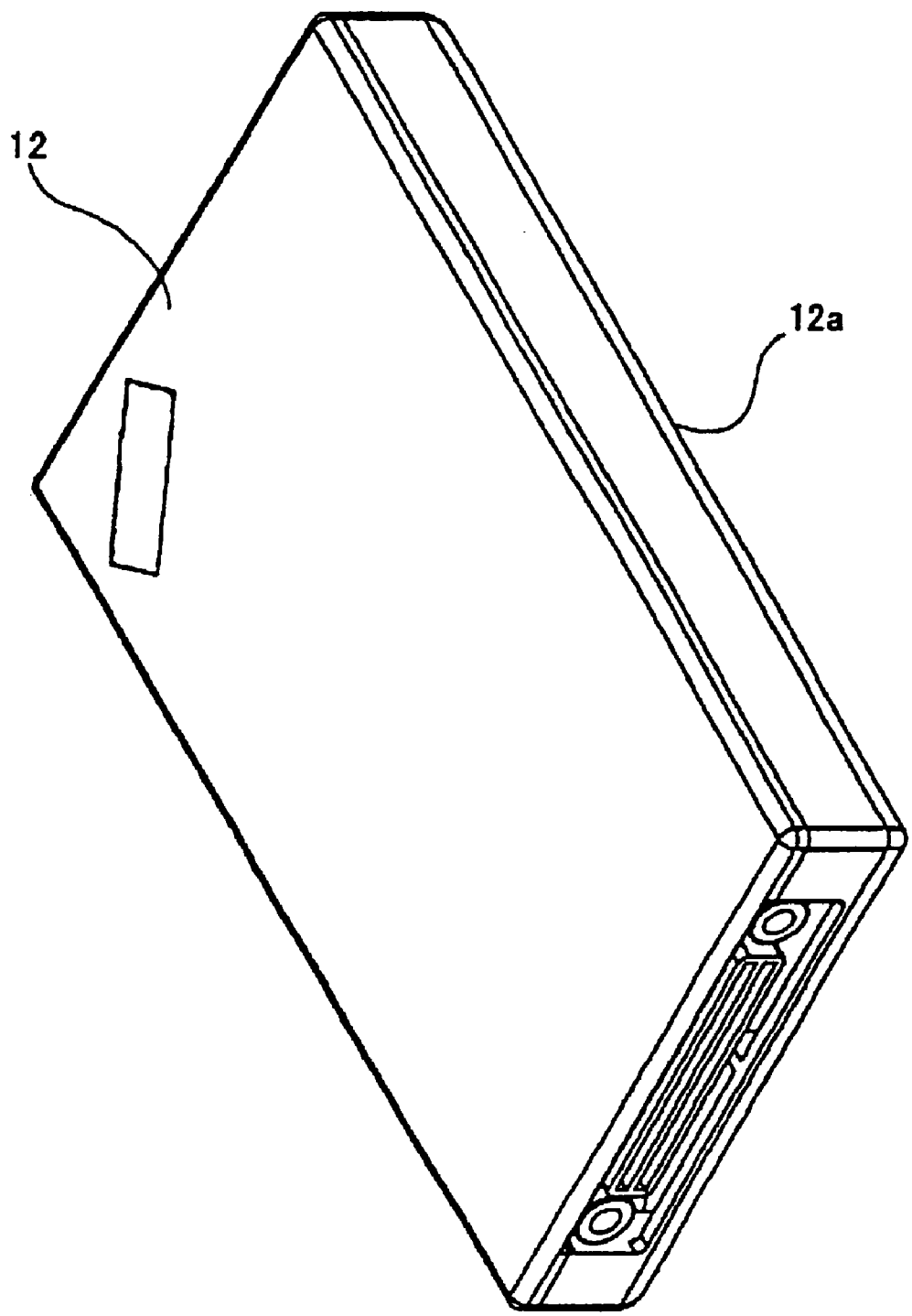
FIG. 9 is a perspective view of the modular PC of the present invention.

FIG. 9 is a perspective view of the modular PC 12 of the present invention. As shown in FIG. 9, the modular PC 12 of the present invention has a rectangular parallelepiped shape. In the embodiment shown in FIG. 9, a mechanism for connecting to the docking station 14 is provided on a shorter side of the modular PC 12. Inside the modular PC 12 shown in FIG. 9, a hard disk drive, memory, CPU, etc. are included as described previously. The modular PC 12 is designed to be integrated with portable connecting means including a liquid crystal display to allow information to be inputted. In the present invention, the above-described modular PC 12 does not necessarily have the rectangular parallelepiped shape, and may have any shape as long as its portability is not impaired.

Figure 10:
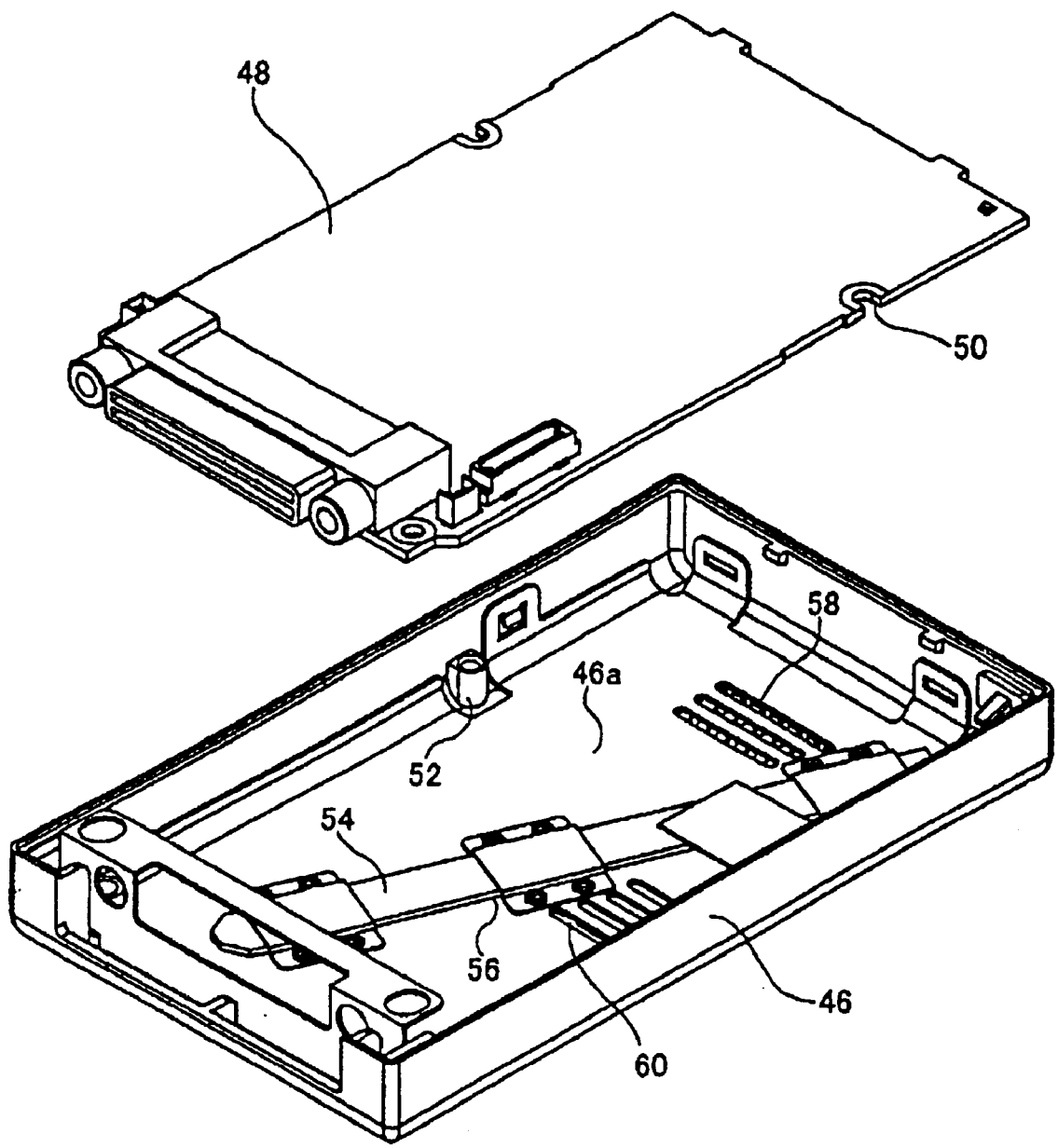
FIG. 10 is an exploded perspective view of the modular PC of the present invention.

FIG. 10 is an exploded perspective view showing an internal constitution of the modular PC 12 in detail by exploding the modular PC 12 of the present invention. For the sake of convenience of explanation, some elements such as a hard disk drive and CPU are not shown. As shown in FIG. 10, the modular PC 12 of the present invention includes a housing member 46 having a rectangular parallelepiped shape for housing the elements such as the hard disk drive, and a wiring board 48 including the CPU and other logic circuits which is fitted to the housing member 46 to form the modular PC 12 of the present invention. Openings 50 are formed on the wiring board 48, so that fixing means such as screws can be inserted so as to fix the wiring board 48 to the housing member 46.

Screw grooves 52 for receiving the screws to fix the wiring board 48 are formed on the housing member 46 at positions corresponding to the above-described openings 50.

Accordingly, it is possible to build the modular PC 12 of the present invention by housing the elements such as the hard disk drive and then combining the housing member 46 and the wiring board 48 together. Alternatively, in the present invention, it is also possible to integrate the housing member 46 with the wiring board 48 by fastening them together using mechanical elements such as hooks, for example, instead of the screws.

According to the embodiment of the modular PC 12 shown in FIG. 10, a side portion 46a of the housing member 46 facing the wiring board 48 is disposed on the side of the docking station 14, so that the side portion 46a is cooled by the air flow blown out of the docking station 14. On the side portion 46a, a thermodiffusive member 54 having high thermal conductivity such as an aluminum plate is provided to effectively diffuse heat generated by heat-generating elements such as the CPU mounted on the wiring board 48. The thermodiffusive member 54 extends almost diagonally along the longitudinal direction of the housing member 46 to form an air passage 56 for flowing the cooling air, which is spaced from the side portion 46a by way of a spacer (not shown) or the like.

The CPU (not shown) is contacted with a thermodiffusive member 54 via a thermal interface directly contacting with the CPU, so that the heat from the CPU is transmitted to the thermodiffusive member 54 to enhance thermal diffusion efficiency. In the present invention, the CPU may be directly connected to the thermodiffusive member 54 without using the thermal interface as long as the CPU is at least connected thermally to the thermodiffusive member 54. A plurality of inlet openings 58 for introducing the cooling air into the modular PC 12 of the present invention are provided on the side portion 46a. Also, in the embodiment shown in FIG. 10, a plurality of outlet openings 60 are formed on the side portion 46a on the opposite side to the inlet openings 58 across the thermodiffusive member 54.

In FIG. 10, the inlet openings 58 and the outlet openings 60 are shown as having an oval shape. However, in the present invention, the number, shape and placement of the above-described openings are not particularly limited as long as efficient cooling is achieved. The cooling air flow from the inlet openings 58 flows around the CPU and through the air passage 56, is drawn out from the outlet openings according to the Bernoulli's theorem, and flows along the back 12a, so that the air flow is generated around the CPU to enhance the thermal diffusion efficiency. Alternatively, the inlet openings 58 may be provided on the lower side than the outlet openings 60 as shown in FIG. 5 so as to flow the cooling air upward.

Figure 11:
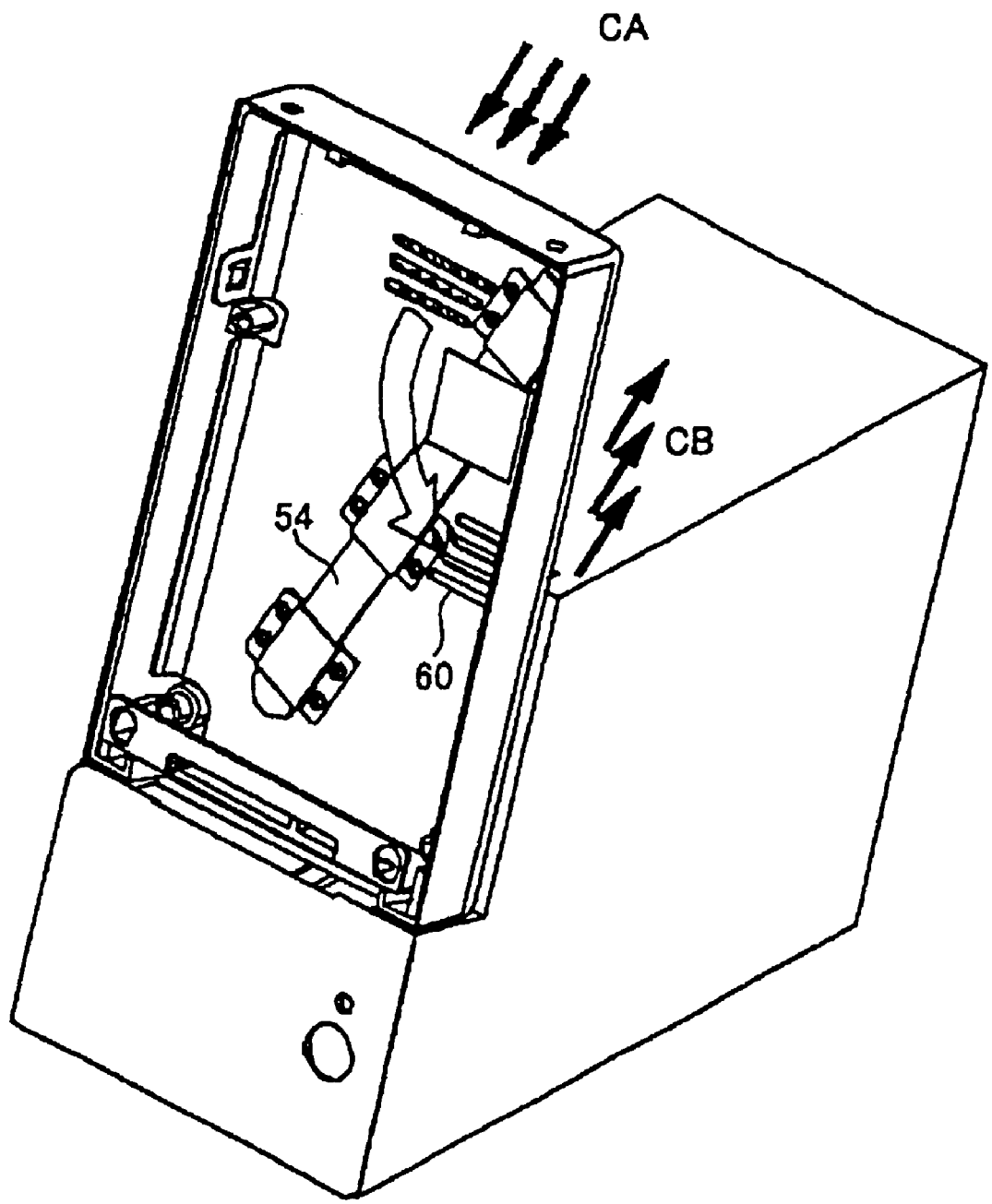
FIG. 11 shows a cooling air flow generated by a cooling method of the present invention.

FIG. 11 schematically shows a flowing state of the cooling air flow inside the modular PC 12 of the present invention shown in FIG. 10. In the embodiment shown in FIG. 11, the cooling air flow is introduced from a position indicated by arrows CA into the modular PC 12 and flows downward across the thermodiffusive member 54. Then, the cooling air flow is discharged out of the modular PC from the outlet openings 60 as indicated by arrows CB.

Figure 12:
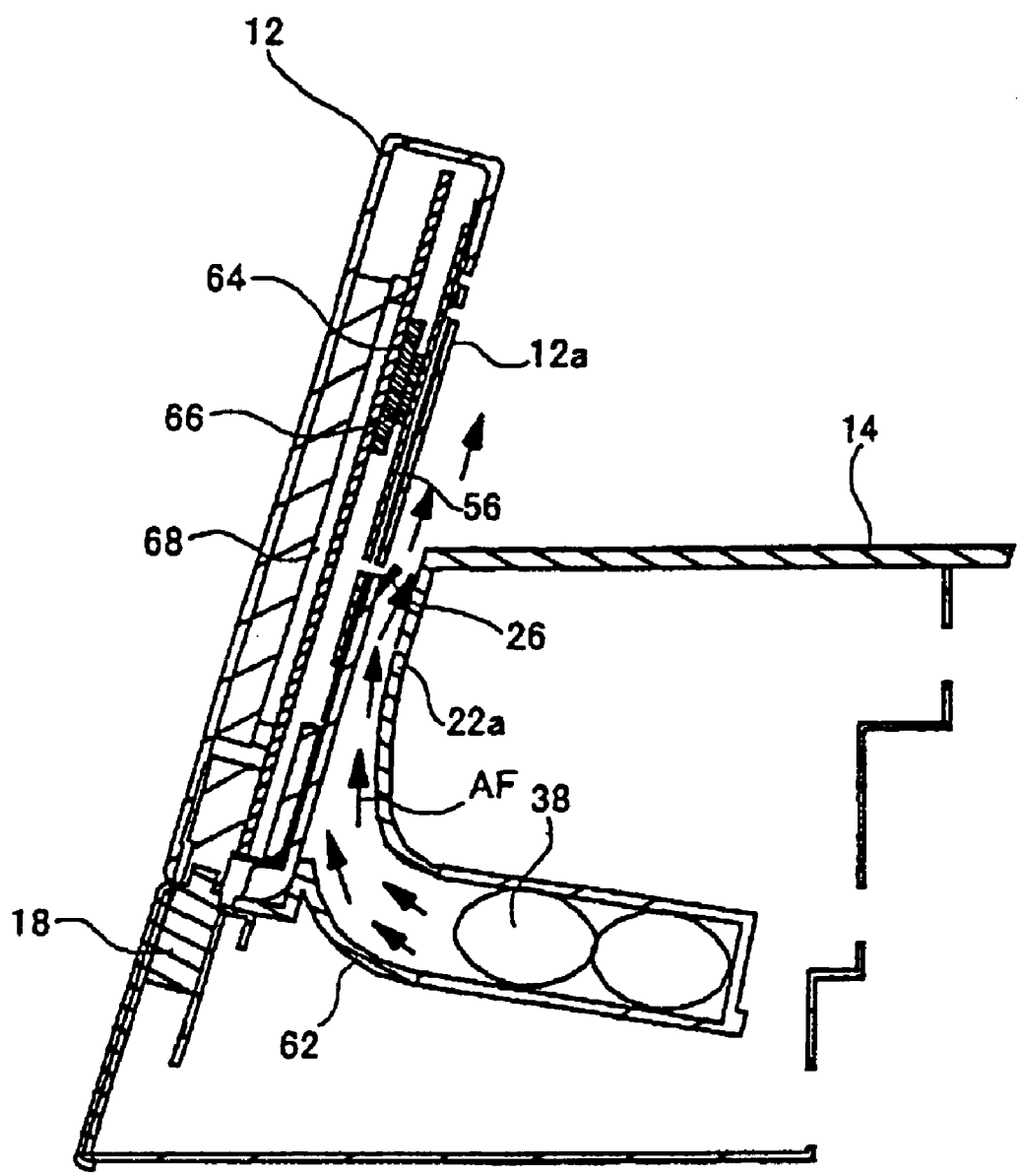
FIG. 12 shows he function of the diffuser in the cooling method of the present invention.

FIG. 12 schematically shows an aspect in which the modular PC 12 of the present invention is integrally joined to the docking station 14 and the cooling air flow from the docking station 14 is flowing along the back 12a of the modular PC 12. The air flow AF generated by the cooling fan 38 housed inside the docking station 14 first flows through a passage 62. The air flow AF flowing out along the passage 62 and a wall face 22a of the air discharge portion 22 collides with the back 12a of the modular PC 12, and is deflected upward in FIG. 12.

The deflected air flow AF further flows along the back 12a of the modular PC 12. The air flow AF increases its flow rate in the vicinity of the outlet openings 60 of the modular PC 12 because the air flow AF passes through a path narrowed by the diffuser 26 disposed on the docking station 14. As a result, the static pressure in the vicinity of the outlet openings 60 is reduced, so that the air inside the modular PC 12 is drawn out from the outlet openings 60 of the modular PC 12.

The air inside the modular PC 12 thus drawn out causes the internal pressure of the modular PC 12 to be negative pressure relative to the external pressure. As a result, external air is drawn in from the inlet openings 58. The air flow thus generated flows toward the outlet openings 60 along an overlapping air passage composed of an air passage 68 formed so as to surround the CPU 64 and the thermal interface 66 contacted with the CPU, which is made of grease or rubber sheet having high thermal conductivity, and the air passage 56 defined by the thermodiffusive member 54 and an inner side of the side portion 46a.

The air flow which flows inside the modular PC 12 as described above finally reaches the outlet openings 60 and is discharged therefrom to complete the cooling cycle. Comparing the above-described cooling method with a method of introducing air from external cooling means, the latter cooling method which forcibly blows the air from the external cooling means would be suitable for cooling a local high-temperature area. However, the air flow heated after cooling a heat source is circulated inside the modular PC 12, which raises a problem that electric and electronic units other than the heat source are heated.

Accordingly, when the latter cooling method which forcibly blows the air from the external cooling means is used, it is indispensable to route the introduced air flow by means of a duct or the like so as to perform heat exchange efficiently while controlling inhalation and exhaust. Therefore, additional members constituting the duct is required. However, in a small-sized device such as the modular PC 12 adopting the present invention, it is not practical to dispose these additional elements because of difficulty in securing a space therefor, and adverse effect to portability such as increases in bulkiness and weight.

If the cooling method of the present invention is used under the above-described conditions, it is possible to achieve efficient introduction of the cooling air from the inlet openings 58 in association with drawing out of the air from the outlet openings 60. To this end, it is preferable not to use the element such as the duct so that ventilation resistance in the modular PC 12 is not increased. According to the present invention, introduction of the cooling air can be achieved by forming simple openings without requiring other auxiliary elements. In addition, it is also possible to form the inlet openings 58 in the vicinity of a heat source to achieve more efficient cooling.

Figure 13:
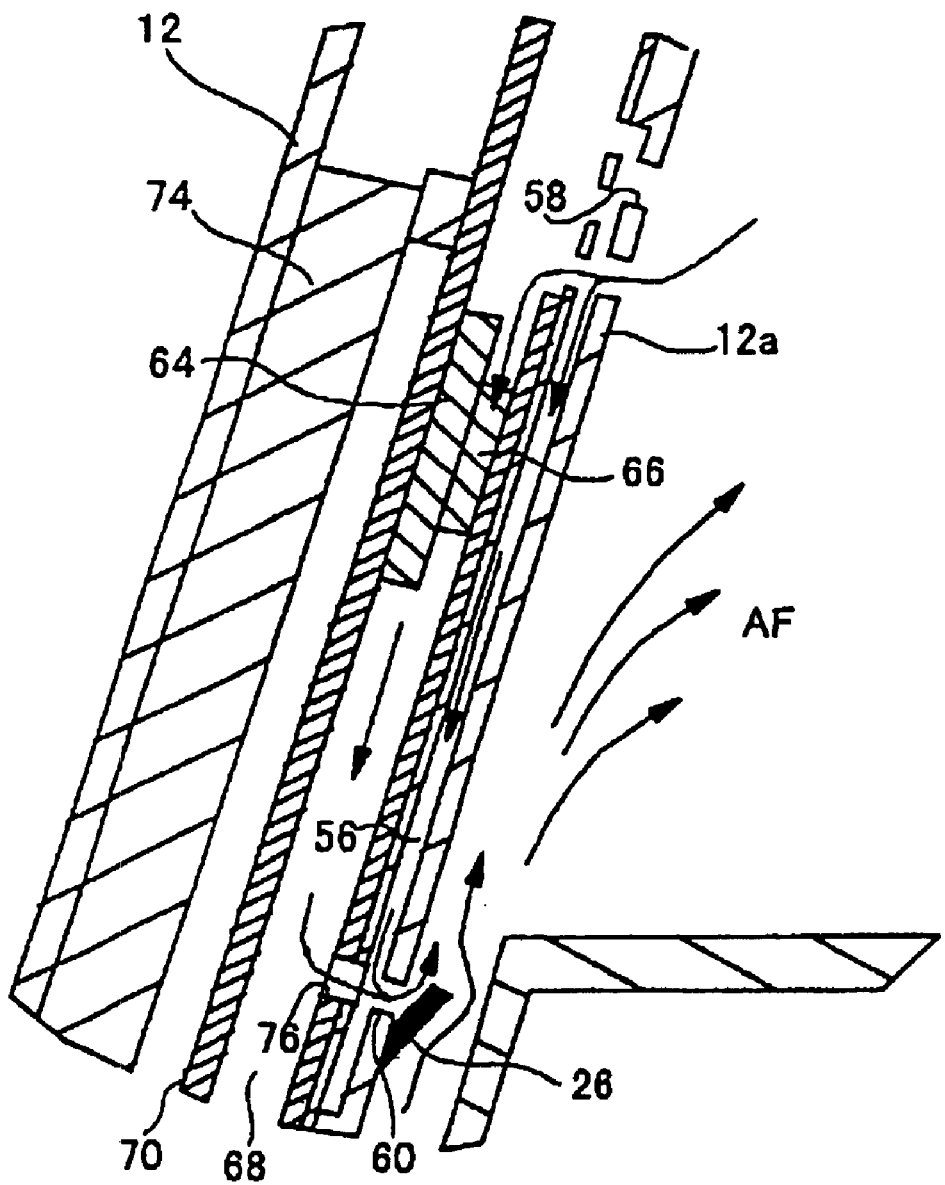
FIG. 13 shows in detail the air flow generated by the cooling method of the present invention.

FIG. 13 is an enlarged view showing a region where the cooling air flows as described above with reference to FIG. 12. As shown in FIG. 13, a substrate 70 on which the CPU 64 is disposed, and a hard disk drive 74 held separately from this substrate 70 by a spacer 72 are provided inside the modular PC 12. The thermal interface 66 is attached to the CPU 64. This thermal interface 66 is thermally connected to the thermodiffusive member 54 so as to diffuse the heat generated by the CPU 64 through the thermodiffusive member 54. The thermodiffusive member 54 is disposed separately from the side portion 46a of the housing member 46 by use of a spacer (not shown) or the like to form the air passage 56 for cooling between the thermodiffusive member 54 and the side portion 46a which allows more efficient cooling.

An opening 76 is formed on a lower side of the modular PC 12 at a position corresponding to the position of the outlet opening 60, which links the air passage 68 and the air passage 56 together, so that the air flowing through the cooling air passage 68 including the CPU 64 and the air flowing through the other cooling air passage 56 formed close to the side portion 40a are discharged together from the outlet opening 60. The diffuser 26 provided on the docking station adjacently to the outlet openings 60 reduces a space between the modular PC 12 and the wall face 22a of the air discharge portion 22 of the docking station 14 to increase the flow rate of the air flow AF passing therethrough, so that the air inside the modular PC 12 is drawn out from the outlet opening 60 in accordance with the Bernoulli's theorem.

The air flow AF which passed through the diffuser 26 further flows along the back 12a of the modular PC 12 to thereby cool the back 12a, so that the cooling efficiency is further improved.

The present invention has been described on the assumption that the diffuser 26 is disposed on the docking station 14. However, according to the present invention, it is also possible to form the diffuser 26 on the modular PC 12 on an upstream side of the flowing direction of the cooling air flow through the outlet opening 60 as long as the flow rate of the air flow near the outlet opening 60 can be increased.

FIG. 14 shows another embodiment of the present invention in which the modular PC 12 is integrated with a portable connection device. FIG. 14(a) is a perspective view which is viewed from a liquid crystal display 78a portion of a connection device 78, and FIG. 14(b) is a perspective view which is viewed from the modular PC 12 side. As shown in FIG. 14(a), the modular PC 12 is connected to the portable connection device 78 upon carrying, which allows a user to input information into the modular PC 12 by, for example, using a stylus pen or a pointer, or touching a character displayed on the liquid crystal panel 78a of the connection device 78 with a finger. After returning to an office, for example, the user may connect the modular PC 12 to the docking station 14 to transfer the inputted information to a desktop display device, a desktop personal computer, etc., to perform higher-level processing.

FIG. 14(b) is the perspective view of the personal computer system shown in FIG. 14(a), which is viewed from the modular PC 12 side. As shown, a plurality of inlet openings 58 and a plurality of outlet openings 60 are formed on the back of the modular PC 12. The modular PC 12 shown in FIG. 14(b) is not provided with the diffuser 26 because it is formed on the docking station.

Figure 15:
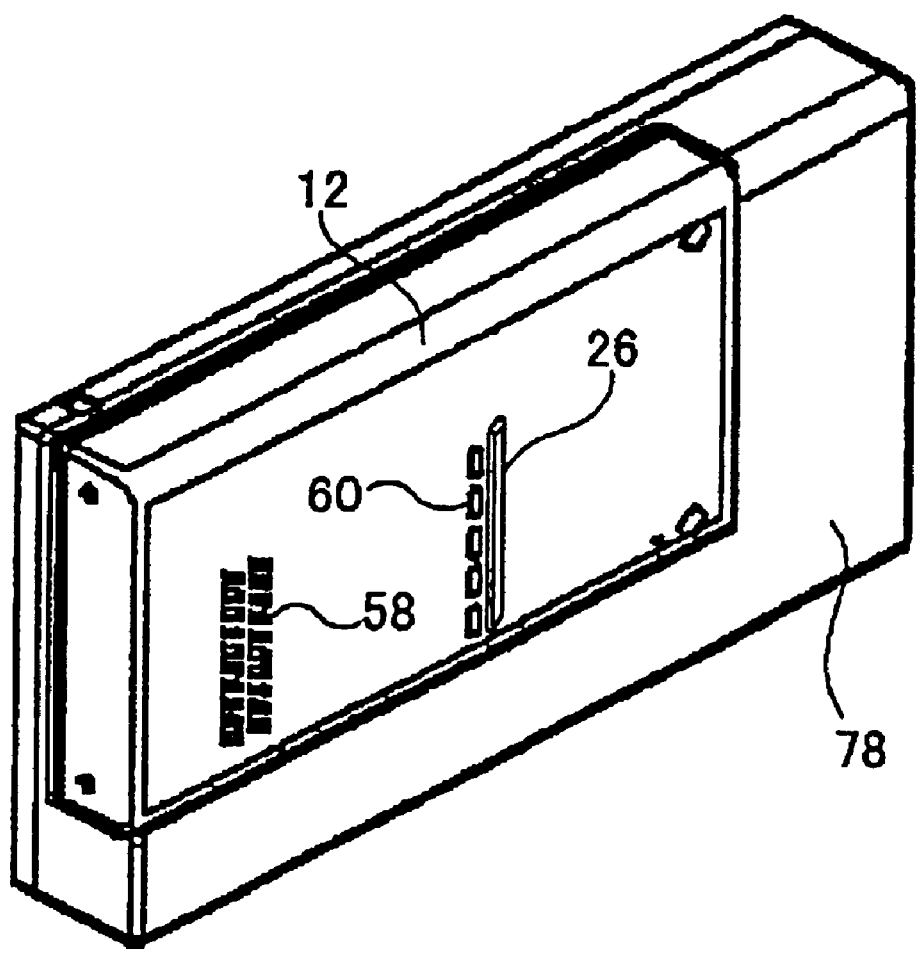
FIG. 15 shows he modular PC according to another embodiment of the present invention, which is provided with a diffuser.
Figure 16:
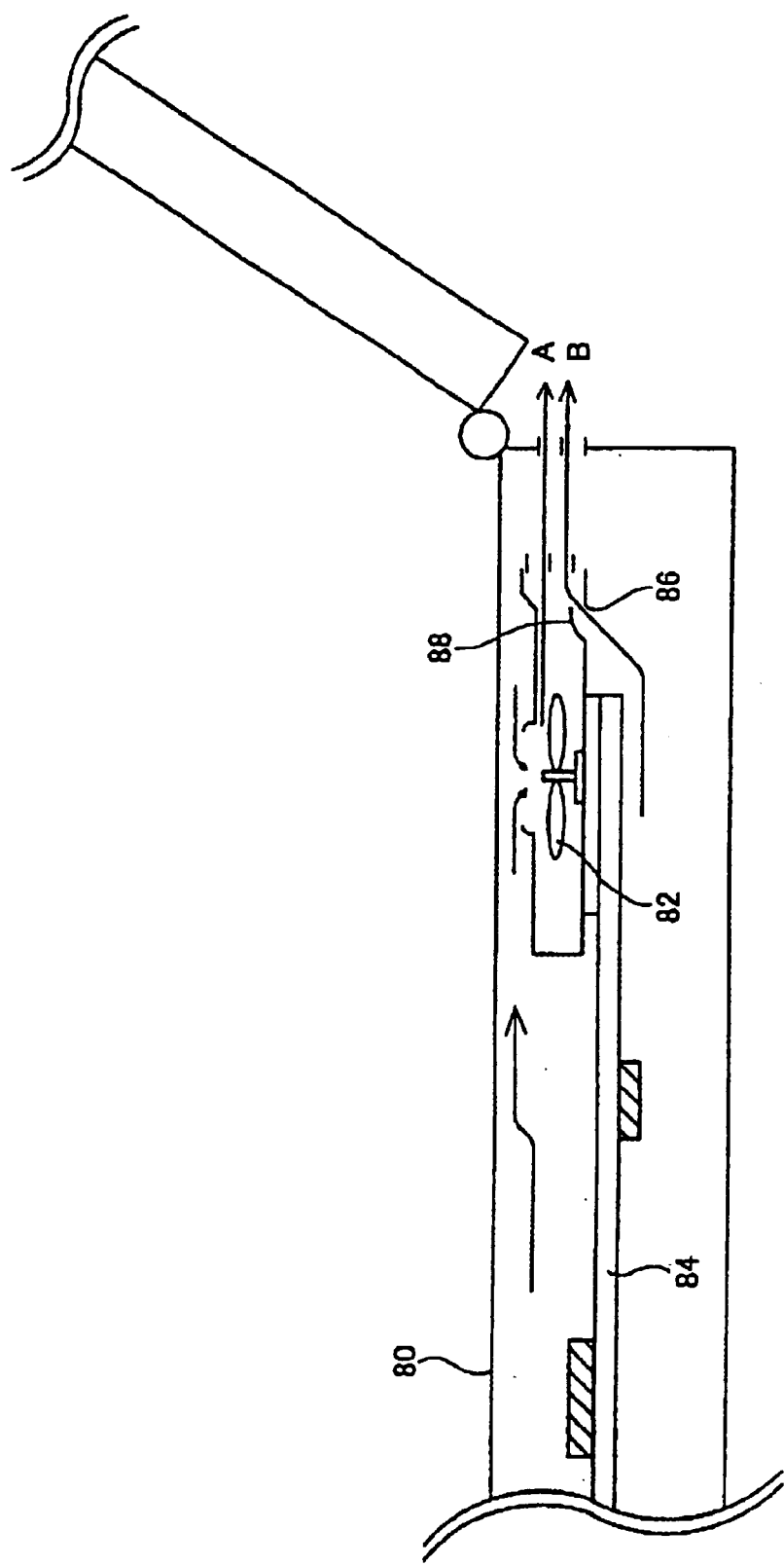
FIG. 16 shows a conventional method of cooling a personal computer.

FIG. 15 is a perspective view of a modular PC 12 according to another embodiment of the present invention, which is viewed from the modular PC 12 side in the state that the modular PC 12 is connected to a portable connection device 78, which is similar to the case shown in FIG. 14. As shown in FIG. 15, a diffuser 26 is formed on the modular PC 12 adjacently to outlet openings 60 on an upstream side of an air flow. In the embodiment shown in FIG. 15, it is not necessary to provide the diffuser 26 on a docking station 14 to be used together with the modular PC 12.

In the following, the result of simulating the effect of the present invention will be described. A simulation test was performed by substituting a heater for the CPU as a heat source on the assumption that the modular PC 12 is driven by the docking station 14. In the simulation test, it was confirmed that a temperature on a surface of the housing of the modular PC was about 55 degrees centigrade when the modular PC was not cooled at all.

In contrast, the temperature on the surface of the housing was reduced by 10 to 15 degrees centigrade when the docking station 14 was equipped with a cooling fan to cool the modular PC forcibly from outside without using a diffuser 26.

Furthermore, according to the present invention in which the diffuser 26 was provided on the docking station 14 to draw out the air inside the modular PC by use of the Bernoulli's theorem, the temperature on the surface of the housing in the simulation was reduced additionally by 2 to 3 degrees centigrade. Thus, when the surface of the housing of the modular PC according to the present invention is cooled down to the same temperature as that achieved by the forced cooling without the diffuser, it is possible to reduce the capacity of cooling means such as a cooling fan, and hence its air blast noise. Furthermore, it is also possible to reduce the size and cost of an expensive element such as a power unit correspondingly to the reduction in the capacity of the cooling fan. Accordingly, it is possible to reduce costs for the docking station 14. If the capacity of the cooling fan is not reduced, then it is possible to cool the surface and inside of the housing down to a lower temperature, which leads to longer life of the elements of the modular PC.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a modular personal computer including a housing and at least a storage device and a central processing unit inside said housing;
   said computer having an inlet opening and an outlet opening for a cooling air flow which are disposed on the same side portion of said housing with a space therebetween so as to sandwich said central processing unit;
   a connection device separate from and couplable with said computer and having a cooling device which cools said side portion of said modular personal computer; and
   a differential pressure generator which reduces static pressure near said outlet opening in relation to relative disposition between said modular personal computer and said connection device,
   wherein the cooling air flow is introduced into said modular personal computer from said inlet opening by reducing the static pressure near said outlet opening to thereby draw out air inside said modular personal computer so as to create negative pressure inside said modular personal computer.

2. Apparatus according to claim 1, wherein the static pressure at said outlet opening is reduced by increasing a flow rate of the air flow flowing near said outlet opening by use of said differential pressure generator.

3. Apparatus according to claim 1, wherein said differential pressure generator is constituted as a diffuser to be disposed close to said outlet opening and on an upstream side in a direction of the air flow flowing near said outlet opening.

4. Apparatus according to claim 3, wherein said diffuser is located on said connection device or a side face of said housing, and said connection device is disposed at least on the top of a desk.

5. A modular personal computer including at least a storage device and a central processing unit inside a housing, and used by connecting to a connection device which is separately constituted, said modular personal computer comprising:
   an inlet opening and an outlet opening for a cooling air flow which are disposed on a side portion of said housing facing said connection device while sandwiching said central processing unit; and
   an air passage extended between said inlet opening and said outlet opening,
   wherein the cooling air flow is introduced into said modular personal computer from said inlet opening by reducing static pressure near said outlet opening and drawing out air inside said modular personal computer by use of differential pressure generating means for reducing the static pressure near said outlet opening and to thereby create negative pressure inside said modular personal computer.

6. The modular personal computer according to claim 5, wherein said differential pressure generating means is means for increasing a flow rate of the air flow flowing near said outlet opening.

7. The modular personal computer according to claim 5, wherein said differential pressure generating means is disposed close to said outlet opening and on an upstream side in a direction of the air flow flowing near said outlet opening.

8. The modular personal computer according to claim 5, wherein said differential pressure generating means is located on said housing.

9. The modular personal computer according to claim 5, wherein a thermodiffusive member is thermally connected to said central processing unit, said thermodiffusive member is extended beyond said inlet opening and said outlet opening and across said cooling air flow, and a cooling air passage is formed between said thermodiffusive member and a side portion of said housing on which each of said openings is formed.

10. A connection device to be connected to a modular personal computer including at least a storage device and a central processing unit inside a housing, used by connecting to the connection device which is separately constituted, and provided with an inlet opening and an outlet opening for a cooling air flow which are disposed on a side portion of said housing with a space therebetween so as to sandwich said central processing unit, said connection device comprising:
   an airflow inducer generating an air flow along said side portion of said modular personal computer when said connection device is connected to said modular personal computer; and
   a differential pressure generator which reduces static pressure of said air flow near said outlet opening in relation to relative disposition between said modular personal computer and said connection device to thereby create negative pressure inside said modular personal computer through said outlet opening.

11. The connection device according to claim 10, wherein said differential pressure generator introduces the cooling air flow from said inlet opening by reducing the static pressure near said outlet opening to thereby draw out air inside said modular personal computer so as to create negative pressure inside said modular personal computer.

12. The connection device according to claim 10, wherein said differential pressure generator increases a flow rate of the air flow flowing near said outlet opening.

13. The connection device according to claim 10, wherein said differential pressure generator is disposed close to said outlet opening and on an upstream side in a direction of the air flow flowing near said outlet opening.

14. The connection device according to claim 10, wherein said differential pressure generator is located on said connection device, and said connection device is disposed at least on the top of a desk.

15. A method of cooling a modular personal computer, comprising the steps of:

provididing a modular personal computer including at least a storage device and a central processing unit inside a housing, used by connecting to a connection device which is separately constituted, and provided with an inlet opening and an outlet opening for a cooling air flow which are disposed on the same side portion of said housing with a space therebetween so as to sandwich said central processing unit;

connecting said side portion of said modular personal computer closely to the connection device including cooling means;

generating a cooling air flow in said modular personal computer from said cooling means;

reducing static pressure near said outlet opening by relative displacement between said modular personal computer and said connection device; and introducing the cooling air flow into said modular personal computer from said inlet opening by reducing the static pressure near said outlet opening to thereby draw out air inside said modular personal computer so as to create negative pressure inside said modular personal computer.

16. The cooling method according to claim 15, wherein said reducing step includes the step of increasing a flow rate of the air flow flowing near said outlet opening by use of differential pressure generating means.

17. The cooling method according to claim 15, wherein said reducing step includes the step of increasing a flow rate of the air flow flowing near said outlet opening by use of a diffuser disposed close to said outlet opening and on an upstream side in a direction of the air flow flowing near said outlet opening.

18. The cooling method according to claim 15, wherein a thermodiffusive member is thermally connected to said central processing unit, said thermodiffusive member is extended beyond said inlet opening and said outlet opening and across said cooling air flow, and an air passage is formed between said thermodiffusive member and the side portion of said housing on which each of said openings is formed.

19. The cooling method according to claim 17, wherein said diffuser is located on said connection device or a side face of said housing, and said connection device is disposed at least on the top of a desk.

* * * * *